June 24, 1958
J. F. NOTTELMANN ET AL
2,840,732
BRUSH HOLDER CLAMPING ARRANGEMENT
Filed Sept. 4, 1956
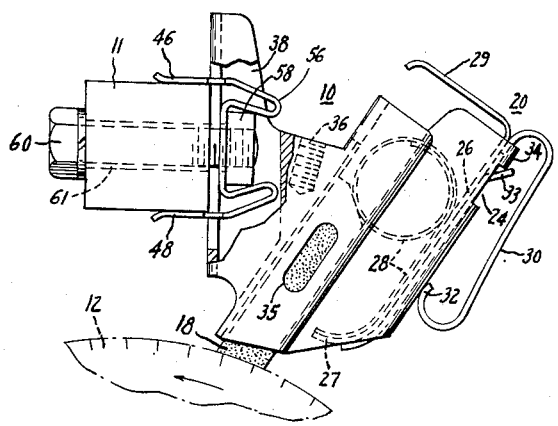
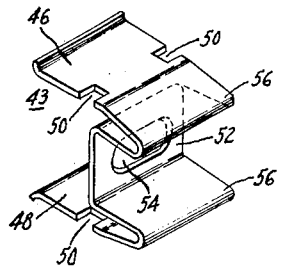
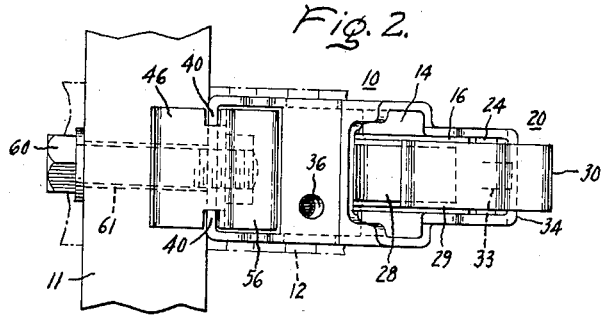
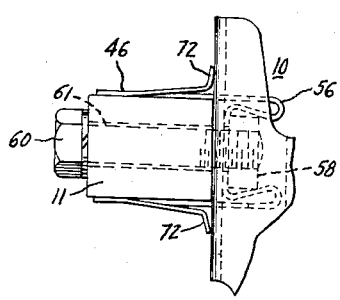
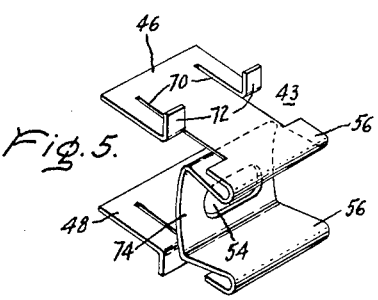
*Inventors:*
*John F. Nottelmann,*
*Carl E. Spaeder,*
by *Vernon J. Kalb*
*Their Attorney.*

United States Patent Office 2,840,732
Patented June 24, 1958

2,840,732
BRUSH HOLDER CLAMPING ARRANGEMENT

John F. Nottelmann and Carl E. Spaeder, Erie, Pa., assignors to General Electric Company, a corporation of New York Application September 4, 1956, Serial No. 607,735

7 Claims. (Cl. 310—239)

The invention described herein relates to dynamoelectric machines and more particularly to a brush holder clamping arrangement, and has for its object the provision of an improved brush holder including an effective and inexpensive device for firmly anchoring and providing adjustability for the holder on a support stud positioned adjacent the commutator for the machine.

Brush holders currently used with dynamoelectric machines are held in a fixed position on a stud or yoke positioned adjacent the machine commutator. The studs are either of round or square configuration and in the usual arrangement, the brush holder is directly attached to the stud by a nut and bolt or similar fastening devices. This type of construction is such that in the event the holder becomes loosened from its mooring, it is caused to move outwardly from the commutator resulting in loss of spring pressure against the carbon brush, and since the optimum distance between the holder and commutator surface is increased, the forces acting on the brush from the rotating commutator creates instability in the brush which adversely affects operation of the machine. Further, the brush may become canted relative to the commutator bars thereby making the brush span a longer peripheral distance on the commutator surface than that for which the machine was designed. In an attempt to eliminate these disadvantages, manufacturers have resorted to the above-mentioned square and rectangular type of stud for eliminating the canting and twisting effect but this arrangement could not provide for axial adjustment of the holder with respect to the commutator which is necessary in order to account for variations in manufacturing tolerances. Other arrangements have been utilized wherein the holders were affixed to a movable stud but the latter involves expensive construction without eliminating the disadvantages in prior structures.

In carrying out our invention we eliminate the above noted deficiencies by providing a spring guide clip arranged for clamping the brush holder firmly and squarely on a stud in a manner to preclude loosening and canting thereof during operation of the machine. The spring guide clip is an intermediate member designed to permit speedy adjustment of the brush holder in both an axial and radial direction relative to the commutator thereby facilitating maintenance and simplifying the alignment process necessary when installing or subsequently adjusting the brush holder on the support stud. The spring guide clip serves an additional function by holding in position a nut adapted for engagement by a bolt extending through the support stud so as to expedite installation of the brush holder on the support stud.

While the specification concludes with claims particularly pointing out and distinctly claiming the subject matter which we regard as our invention, it is believed the invention will be better understood from the following description taken in connection with the accompanying drawings in which:

Figure 1 is a view in elevation with parts broken away, showing a preferred mounting arrangement of the brush holder on a support stud;

Figure 2 is a plan view of the parts shown in Figure 1;

Figure 3 is a perspective view of the spring guide clip of the invention;

Figure 4 is a modification showing another arrangement for attaching a brush holder to a support stud; and Figure 5 is a perspective view of this spring guide clip shown in Figure 4.

Referring now to the drawings wherein like reference characters designate like or corresponding parts throughout the several views, there is shown in Figures 1 and 2 a cast brush holder 10 of bronze or other material of high conductivity attached to a stud 11 positioned adjacent the commutator 12 for a dynamoelectric machine. The brush holder is formed to provide a box of T-like configuration on its right side, including a pair of channels 14 and 16 respectively arranged for receiving a carbon brush 18 and a spring assembly 20. The spring assembly is of a type disclosed and claimed in our copending application entitled "Spring Assembly for Carbon Brush Holder," Serial No. 607,736, filed September 4, 1956 and assigned to the same assignee as the present invention. The assembly generally consists of a backing number 26 curved inwardly at its bottom 27 for receiving a spring 28 pre-stressed in a manner to exert a constant predetermined force on the brush during the life thereof. The upper end 29 of the backing member 26 is bent at a right angle to a position overlying the channels 14 and 16 in order to prevent ejection of the brush 18 during certain operating conditions of the machine. Attached to the opposite side of the backing member 26 is a second spring 30 having an end 32 designed to exert a pressure in the neighborhood of 2 p. s. i. against the side of the brush holder body. Protruding lug 33 extends through opening 24 in the holder body to engage member 34 and thereby lock the spring assembly in position. In operation, when it is desired to replace the brush 18 in the brush holder body, the spring assembly 20 is pressed downwardly to disengage lug 33 from member 34 and then drawn upwardly until member 32 engages opening 24 whereupon it snaps into the opening, engaging the backside of spring 30 and thereby permitting the spring assembly to be pivoted over the top 34 of the brush holder without becoming detached therefrom.

As clearly shown in Figure 1, the box-like member of the brush holder body is provided with a window or viewing slot 35 located in a position to indicate the degree of brush wear. Electrical connection for the wire shunt of the carbon brush is provided at 36 and merely consists of a drilled and tapped hole provided in the top of the brush holder body adapted to receive a screw and lock nut (not shown) for completing the connection.

The left side of the brush holder is cast in a manner to provide a channel 38 which is partially closed by a pair of oppositely disposed but inwardly directed flanges or shoulders 40. This portion of the brush holder is formed at an angle to the centerline of the brush so as to permit correct alignment of the holder for varying conditions of wear of the commutator. As shown in Figure 1, the holder is attached to the support stud 11 by a spring guide clip 43 positioned therebetween.

Referring to Figure 3, the spring guide clip is curved to form a plurality of surfaces in the manner shown and consists of a pair of oppositely disposed fingers 46 and 48 having openings 50 provided in the sides thereof. The clip is further provided with a flat member 52 having an elongated opening 54 provided in the face thereof. The construction of the clip is such that turned-back jaws 56 are biased inwardly toward opening 54 so that upon the application of a force urging fingers 46 and 48 toward one another, sufficient space is provided between the jaws 56 to receive a nut 58 adapted to be threadably engaged by bolt 60 extending through the support stud 11.

In applying the spring guide clip to the brush holder body, the fingers are pressed inwardly and nut 58 inserted therebetween in the manner described above. Release of pressure on fingers 46 and 48, permits the jaws 56 to firmly grasp the nut thereby eliminating the need to manually hold the nut when attempting to thread bolt 60 thereinto. The spring guide clip 43 with the attached nut is then positioned on the holder body by causing the spaced flanges 40 to engage the aligned openings 50 provided in the clip. Subsequent movement of the clip on the holder can readily be made by merely urging the clip in an up or downward direction. Reference to Figure 1 will show that the holder is affixed to the support stud 11 by threading an end bolt 60 through the nut 58. It will be evident that prior to tightening of nut 58, the brush holder can be moved vertically through a plurality of positions thereby permitting speedy adjustment of the holder with respect to the commutator as the latter wears during use.

Axial adjustment of the holder is made possible by the provision of elongated slot 54 in the spring guide clip. As aforementioned, after the clip is installed on the holder, relative movement in an axial direction between these two parts is precluded because of the snug fit of flanges 40 in openings 50 provided in the clip. Accordingly, the holder can be moved on the support stud 11, prior to tightening of nut 58, a distance equal to the length of slot 54 in the clip minus the diameter of bolt 60. In the specific embodiment disclosed, the clearance hole 61 in the stud 11 is purposely made larger than the diameter of bolt 60 so as to obtain an even greater axial adjustment than that provided by the spring clip alone.

In view of the above, it is apparent that the modified arrangement of the brush holder and newly designed spring guide clip permits considerable flexibility in the combination disclosed. The installation of the brush holder on the support and can be made in a minimum of time because of the few number of parts used and also because the clip is designed to firmly grasp the nut 58 in a position in direct alignment with bolt 60, thereby eliminating the necessity for an operator to align the bolt and nut in an area otherwise inaccessible. The arrangement of parts allows adjustment of the holder in both an axial and radial direction requiring no greater effort than loosening and tightening a readily accessible nut and bolt.

The modification shown in Figures 4 and 5 is similar to that previously disclosed, the difference lying in the design of the clamping fingers 46 and 48. In this embodiment, the clamping fingers are each cut along their length as at 70 to provide a pair of upstanding lugs 72 which serve as spring members when the spring guide clip 43 is attached to the brush holder. The surface 74 is rounded slightly as shown and is provided with an elongated slot 54 as previously described. Jaws 56 also are utilized for clamping a nut 58 in position prior to assembly on the holder.

In operation, the fingers 46 and 48 are manually bent inwardly to open jaws 56 for receiving nut 58. The spring guide clip is then slid downwardly on flanges 40 in a manner wherein the rounded surface 74 is caused to contact the inner surface of flanges 40 by the action of lugs 72 pressing on the outer surface of flanges 40. Attachment to the support stud 11 is made by the above-described bolt and nut arrangement. Reference to Figure 4 will show that when the nut 58 is tightened against surface 74 by the bolt 60, the surface 74 is flattened and lugs 72 brought to bear against flanges 40 thereby supplementing the locking action of the bolt and nut on the device. The fingers 46 and 48 engage the top and bottom surfaces of the support stud to assure alignment of the brush holder relative to the commutator.

In each of the embodiments disclosed above, it is desirable to fix the spring guide clip permanently on the brush holder body. This is accomplished by staking over the flanges 40 at their uppermost ends where the clip is inserted on the holder, thereby uniting the parts into a single assembly and facilitating their assembly on stud 11. Other securing means may also be used, such as brazing the clip to flanges 40 for example.

It will be apparent that in view of the foregoing, many modifications and variations are possible in light of the above teachings. It is therefore to be understood that within the scope of the appended claims, the invention may be practiced otherwise than as specifically described.

What we claim as new and desire to secure by Letters Patent of the United States is:

1. A brush holder for use with a dynamoelectric machine comprising a body member adapted for receiving a carbon brush and a spring assembly biasing the brush into contact with a commutator for said machine, a support on said body member arranged to receive an aligning member movably mounted thereon, means immovably connecting said aligning member to a stud for preventing movement in a vertical direction and for selectively locating said body member in a fixed position radially of said commutator, and means provided on said aligning member for fixing the position of said body member axially of said commutator.

2. A brush holder for use with a dynamoelectric machine comprising a body member for receiving a carbon brush and a spring assembly urging the carbon brush into contact with a commutator for said machine, a pair of flanges on said body member spaced a distance to receive a spring guide clip slidable radially of said commutator, means connecting said spring guide clip and said body member on a support stud adjacent said commutator, said body member being selectively fixed with respect to said commutator by virtue of the slidable arrangement of said guide clip on said flanges, said spring guide clip having projecting ends arranged to contact said support stud for preventing movement of said body member relative to said stud after being connected thereto by said means, and means on said clip arranged for providing adjustment of said body member axially of said commutator.

3. The combination according to claim 2 wherein said projecting ends are provided with spring members arranged to contact said flanges on said body member.

4. A brush holder for use with a dynamoelectric machine comprising a body member for receiving a carbon brush and a spring assembly for biasing the brush into contact with a commutator for said machine, a pair of flanges on said body member, a spring guide clip comprising spaced fingers having cut-out portions in opposite sides thereof of a size sufficient to permit mounting of said clip on said flanges thereby allowing movement of said body member in a direction radially of said commutator but restricting movement thereof in all other directions, an elongated slot in a wall of said clip perpendicular to said fingers, and a bolt extending through a stud and said slot for locking said clip and body member to said stud when threadably engaged by a nut adjacent said elongated slot, thereby providing for adjustment of said body member axially of said commutator.

5. A brush holder for use with a dynamoelectric machine comprising a body member for receiving a carbon brush and a spring assembly for urging the carbon brush into contact with a commutator for said machine, a support on said body member, a spring guide clip movably mounted on said support, a nut held between projecting ends of said clip and being threaded for engagement by a bolt extending through a support stud positioned adjacent said commutator thereby firmly securing said clip and body member to said stud, said clip further including an elongated slot through which said bolt passes for providing axial adjustment of said body member.

6. The combination according to claim 5 wherein said clip is provided with a pair of spaced fingers integral with but oppositely disposed from said projecting ends arranged to contact the outer and inner sides of said stud so as to prevent turning of said body member relative to said stud.

7. The combination according to claim 6 wherein said spaced fingers are provided with integrally formed spring elements arranged to abut said body member thereby to hold the latter in a fixed position.

References Cited in the file of this patent

FOREIGN PATENTS

| | | |
|---|---|---|
| 374,856 | Germany | May 1, 1923 |
| 698,072 | Germany | Oct. 31, 1940 |